(12) United States Patent
Lee et al.

(10) Patent No.: US 12,340,119 B2
(45) Date of Patent: Jun. 24, 2025

(54) MEMORY SYSTEM AND OPERATING METHOD OF THE MEMORY SYSTEM

(71) Applicant: SK hynix Inc., Icheon-si (KR)

(72) Inventors: Se Ho Lee, Icheon-si (KR); Min Gu Kang, Icheon-si (KR)

(73) Assignee: SK hynix Inc., Icheon-si (KR)

(*) Notice: Subject to any disclaimer, the term of this patent is extended or adjusted under 35 U.S.C. 154(b) by 150 days.

(21) Appl. No.: 18/084,930

(22) Filed: Dec. 20, 2022

(65) Prior Publication Data

US 2023/0359393 A1    Nov. 9, 2023

(30) Foreign Application Priority Data

May 3, 2022  (KR) .......................... 10-2022-0054640

(51) Int. Cl.
*G06F 3/06* (2006.01)
*G06F 12/02* (2006.01)
*G06F 13/16* (2006.01)

(52) U.S. Cl.
CPC .......... *G06F 3/0659* (2013.01); *G06F 3/0607* (2013.01); *G06F 3/0658* (2013.01); *G06F 3/0679* (2013.01)

(58) Field of Classification Search
CPC .... G06F 3/0659; G06F 3/0607; G06F 3/0658; G06F 3/0679

USPC ......................................................... 711/154
See application file for complete search history.

(56) References Cited

U.S. PATENT DOCUMENTS

| | | | |
|---|---|---|---|
| 2011/0167230 A1* | 7/2011 | Quan | G06F 3/061 711/170 |
| 2015/0149735 A1* | 5/2015 | Nale | G06F 13/1678 711/147 |
| 2020/0050366 A1* | 2/2020 | Bavishi | G06F 3/061 |
| 2020/0050398 A1* | 2/2020 | Meyerowitz | G06F 3/0685 |
| 2020/0371689 A1* | 11/2020 | Sen | G06F 3/067 |
| 2021/0157514 A1* | 5/2021 | Koo | G06F 12/128 |

FOREIGN PATENT DOCUMENTS

| | | |
|---|---|---|
| KR | 101880407 B1 | 7/2018 |
| KR | 101924467 B1 | 12/2018 |

* cited by examiner

*Primary Examiner* — Arpan P. Savla
*Assistant Examiner* — Sidney Li
(74) *Attorney, Agent, or Firm* — WILLIAM PARK & ASSOCIATES LTD.

(57) ABSTRACT

A memory system includes a non-volatile memory device and a performance manager. The performance manager activates a plurality of sub-controllers according to a setting of a host device, allocates memory regions respectively to the plurality of sub-controllers, the memory regions being included in the non-volatile memory device, and determines, according to maximum performance values and a size ratio of the memory regions, credit sets to be allocated respectively to the plurality of sub-controllers.

20 Claims, 11 Drawing Sheets

MEMORY SYSTEM AND OPERATING METHOD OF THE MEMORY SYSTEM

CROSS-REFERENCES TO RELATED APPLICATION

The present application claims priority under 35 U.S.C. § 119(a) to Korean application number 10-2022-0054640, filed on May 3, 2022, in the Korean Intellectual Property Office, which is incorporated herein by reference in its entirety as set forth in full.

BACKGROUND

1. Technical Field

Various embodiments are related to a memory system, and more particularly, to a memory system including a non-volatile memory device.

2. Related Art

A memory system may be configured to store data provided by a host device in response to a write request from the host device. Furthermore, the memory system may be configured to provide stored data to the host device in response to a read request from the host device. The host device is an electronic device capable of processing data and may include a computer, a digital camera or a mobile phone. The memory system may be mounted in the host device or may be fabricated to be capable of being connected to and detached from the host device.

SUMMARY

In an embodiment, a memory system may include a non-volatile memory device and a performance manager. The performance manager may be configured to activate a plurality of sub-controllers according to a setting of a host device, allocate memory regions respectively to the plurality of sub-controllers, the memory regions being included in the non-volatile memory device, and determine, according to maximum performance values and a size ratio of the memory regions, credit sets to be allocated respectively to the plurality of sub-controllers.

In an embodiment, an operating method of a memory system may include activating a plurality of sub-controllers according to a setting of a host device; allocating memory regions respectively to the plurality of sub-controllers; and determining, according to maximum performance values and a size ratio of the memory regions, credit sets to be allocated respectively to the plurality of sub-controllers.

In an embodiment, an operating method of a memory system may include receiving an operation command for a first sub-controller among a plurality of sub-controllers; controlling, when a sequential operation credit of the first sub-controller is greater than zero (0) and a random operation credit of the first sub-controller is greater than zero (0), the first sub-controller to process the operation command; and reducing the sequential operation credit and the random operation credit of the first sub-controller.

DETAILED DESCRIPTION

Examples of embodiments of the present disclosure will be described below in more detail with reference to the accompanying drawings. The present disclosure may, however, be embodied in different forms and should not be construed as limited to the embodiments set forth herein.

The drawings are not necessarily to scale and, in some instances, proportions may have been exaggerated in order to clearly illustrate features of the embodiments. The terminology used herein is for the purpose of describing particular embodiments only and is not intended to be limiting of the disclosure.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, various embodiments of the present disclosure will be described below with reference to the accompanying drawings.

In accordance with an embodiment, provided may be memory system and operating method of the memory system capable of supporting sub-controllers configured to always provide a maximum read performance and configured to steadily provide a write performance of the same ratio.

Figure 1:
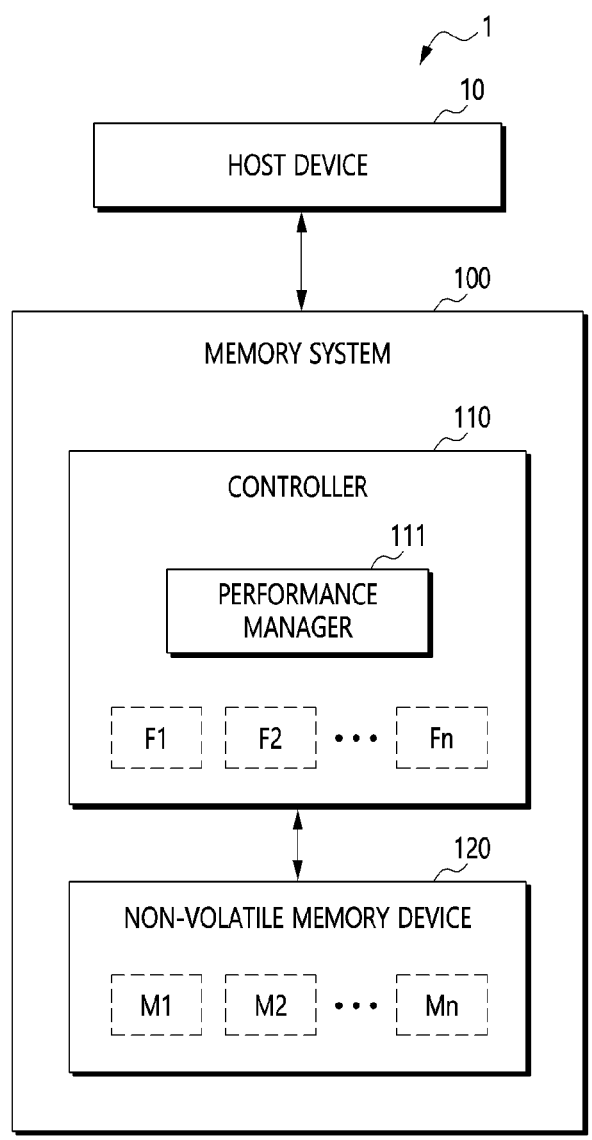
FIG. 1 is a block diagram illustrating a data processing system including a memory system in accordance with an embodiment.

FIG. 1 is a block diagram illustrating a data processing system 1 including a memory system 100 in accordance with an embodiment.

The data processing system 1 may include a host device 10 and the memory system 100.

The memory system 100 may be configured to store data provided by the host device 10 in response to a write request from the host device 10. Furthermore, the memory system 100 may be configured to provide stored data to the host device 10 in response to a read request from the host device 10.

The memory system 100 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 100 may include a controller 110 and a non-volatile memory device 120.

The controller 110 may control an overall operation of the memory system 100. The controller 110 may control the non-volatile memory device 120 in order to perform a foreground operation in response to an instruction from the host device 10. The foreground operation may include operations of writing data in the non-volatile memory device 120 and reading data from the non-volatile memory device 120 in response to instructions from the host device 10, that is, a write request and a read request.

Furthermore, the controller 110 may control the non-volatile memory device 120 in order to perform an internally necessary background operation independently of the host device 10. The background operation may include at least one among a wear-leveling operation, a garbage collection operation, an erase operation, a read reclaim operation and a refresh operation for the non-volatile memory device 120. Like the foreground operation, the background operation may include operations of writing data in the non-volatile memory device 120 and reading data from the non-volatile memory device 120.

The controller 110 may include a performance manager 111.

According to setup of the host device 10, the performance manager 111 may activate a plurality of sub-controllers F1 to Fn and may allocate, to the plurality of sub-controllers F1 to Fn, respective memory regions M1 to Mn that are divided from a whole memory region of the non-volatile memory device 120. The host device 10 may determine a size ratio of the memory regions M1 to Mn. As required, the host device 10 may adjust a number of the sub-controllers F1 to Fn and the size ratio of the memory regions M1 to Mn. Through the plurality of sub-controllers F1 to Fn, the host device 10 may utilize the memory system 100 as if the memory system 100 were a plurality of drives. Each of the sub-controllers F1 to Fn may be able to access the non-volatile memory device 120 by being activated. Under the control of the host device 10, each of the sub-controllers F1 to Fn may independently access the allocated memory region. For example, the plurality of sub-controllers F1 to Fn may be the physical functions of the Non-Volatile Memory Express (NVMe) device.

Based on maximum performance values of the memory system 100 and the size ratio of memory regions M1 to Mn, the performance manager 111 may determine credit sets that are to be allocated respectively to the plurality of sub-controllers F1 to Fn. the maximum performance values may include the maximum sequential write speed, the maximum random write speed, the maximum sequential read speed and the maximum random read speed. The credit sets may include a sequential write credit, a random write credit, a sequential read credit and a random read credit.

Specifically, the performance manager 111 may divide each of the maximum performance values according to the size ratio of the memory regions M1 to Mn, may convert the divided values into respective credits and may allocate the converted credits respectively to the plurality of sub-controllers F1 to Fn. For example, the performance manager 111 may divide the maximum sequential write speed according to the size ratio of the memory regions M1 to Mn, may convert the divided values into the sequential write credits and may allocate, during an initialization operation on the sequential write credit, the converted sequential write credits respectively to the plurality of sub-controllers F1 to Fn.

The performance manager 111 may initialize the sequential write credits and the random write credits together and may initialize the sequential read credits and the random read credits together. Specifically, the performance manager 111 may perform a second initialization operation on the sequential write credits and the random write credits of all the plurality of sub-controllers F1 to Fn when a first write credit initialization period elapses from completion of a first initialization operation and when there is not any pending write command or a second write credit initialization period elapses. The performance manager 111 may perform a second initialization operation on the sequential read credits and the random read credits of all the plurality of sub-controllers F1 to Fn when a read credit initialization period elapses from completion of a first initialization operation.

For a write command for a selected sub-controller, e.g., the first sub-controller F1, the performance manager 111 may utilize a sequential write credit and a random write credit of the first sub-controller F1. For a read command for the first sub-controller F1, the performance manager 111 may utilize a sequential read credit and a random read credit of the first sub-controller F1.

Specifically, when the sequential operation credit of the first sub-controller F1 is greater than zero (0) and the random operation credit of the first sub-controller F1 is greater than zero (0), the performance manager 111 may control the first sub-controller F1 to process an operation command and may reduce the sequential operation credit and the random operation credit of the first sub-controller F1. Here, the sequential operation credit and the random operation credit may be the sequential read credit and the random read credit, respectively, when the operation command is a read command. The sequential operation credit and the random operation credit may be the sequential write credit and the random write credit, respectively, when the operation command is a write command.

When at least one of the sequential operation credit and the random operation credit of the first sub-controller F1 is not greater than zero (0), the performance manager 111 may control the first sub-controller F1 to process the operation command after the sequential operation credit and the random operation credit of the first sub-controller F1 are initialized.

The performance manager 111 may calculate an adjustment amount based on a data amount, which is processed according to the operation command, and may reduce the sequential operation credit by the adjustment amount. The performance manager 111 may reduce the random operation credit by an adjustment amount. Here, the adjustment amount may be irrelevant to the data amount, which is processed according to the operation command.

Under the control of the controller 110, the non-volatile memory device 120 may store therein data provided from the controller 110 and may read data stored therein to provide the read data to the controller 110.

The non-volatile memory device 120 may include a flash memory device (e.g., the NAND Flash or the NOR Flash), the Ferroelectrics Random Access Memory (FeRAM), the Phase-Change Random Access Memory (PCRAM), the Magnetic Random Access Memory (MRAM), the Resistive Random Access Memory (ReRAM) and so forth.

Figure 2:
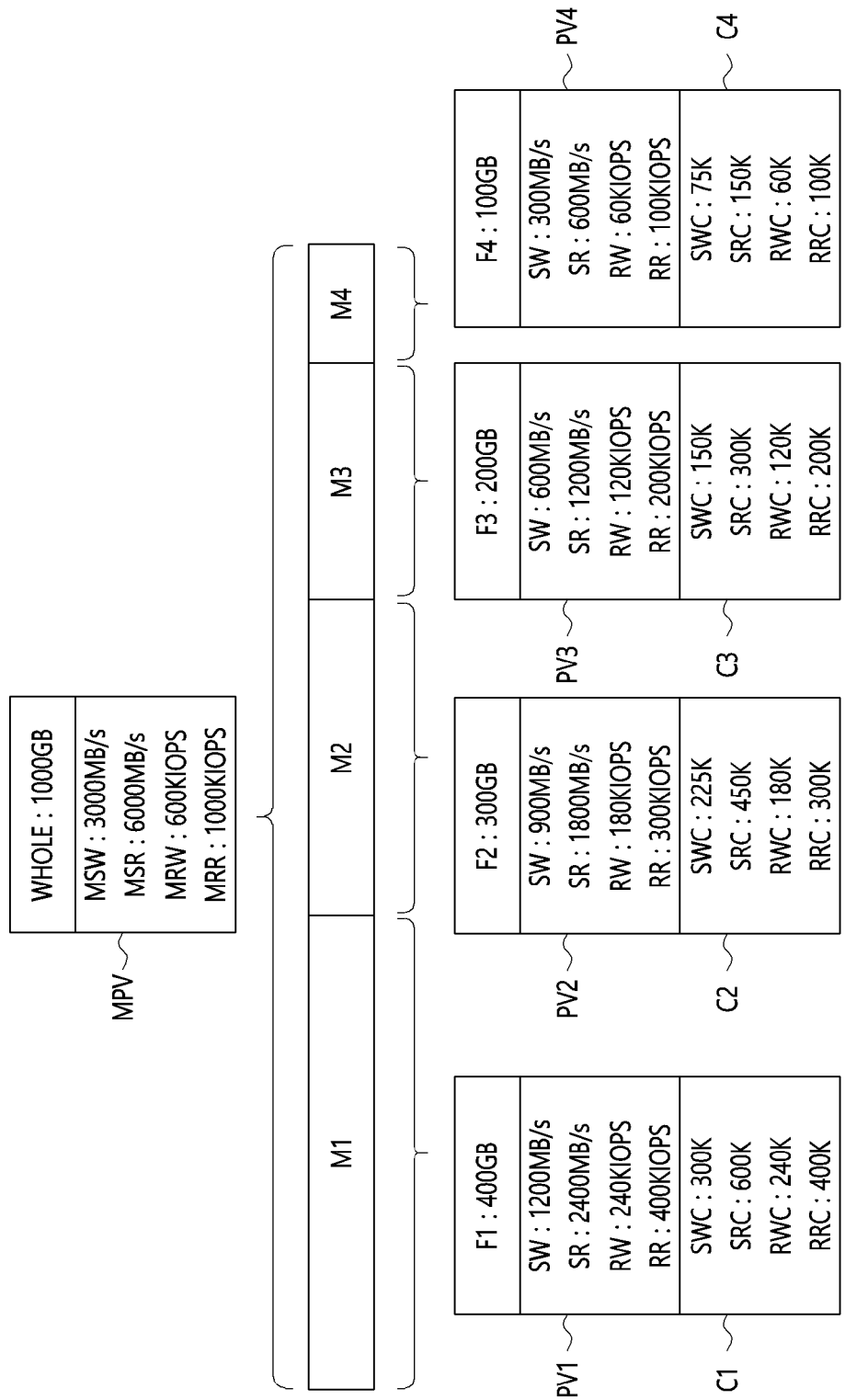
FIG. 2 is a diagram illustrating a scheme that a performance manager calculates a credit set to be allocated to each sub-controller in accordance with an embodiment.

FIG. 2 is a diagram illustrating a scheme that the performance manager 111 calculates a credit set to be allocated to each sub-controller in accordance with an embodiment. For description of FIG. 2, it is assumed that first to fourth sub-controllers F1 to F4 are activated.

Referring to FIG. 2, the maximum performance values MPV of the memory system 100 may include a maximum sequential write speed MSW, a maximum sequential read speed MSR, a maximum random write speed MRW and a maximum random read speed MRR. The maximum performance values MPV may represent the performance of the memory system 100 when a single one of the first to fourth sub-controllers F1 to F4 operates. The maximum performance values MPV may be measured through a test operation while the memory system 100 is fabricated or while the memory system 100 operates. For example, the maximum sequential write speed MSW and the maximum sequential read speed MSR may be measured in units of B/s (i.e., Byte Per Second) and the maximum random write speed MRW and the maximum random read speed MRR may be measured in units of 4 KB IOPS (i.e., Input/Output Operations Per Second).

A whole memory region of the memory system 100 may be divided into first to fourth memory regions M1 to M4 respectively corresponding to the first to fourth sub-controllers F1 to F4. For example, the size ratio of the first to fourth memory regions M1 to M4 may be 4:3:2:1. Therefore, when the size of the whole memory region is 1000 GB (i.e., 1000 gigabytes), the sizes of the first to fourth memory regions M1 to M4 may be respectively 400 GB, 300 GB, 200 GB and 100 GB.

Performance values PV1 to PV4 of the first to fourth sub-controllers F1 to F4 may be obtained, respectively, by dividing respective items of the maximum performance values MPV according to the size ratio of the first to fourth memory regions M1 to M4. For example, the sequential write speeds SW of the respective first to fourth sub-controllers F1 to F4 may be obtained by dividing the maximum sequential write speed MSW according to the size ratio 4:3:2:1.

Credit sets C1 to C4 may be calculated on the basis of the performance values PV1 to PV4 and may be allocated to the first to fourth sub-controllers F1 to F4, respectively. In other words, each of the credit sets C1 to C4 may be calculated on the basis of a corresponding one of the performance values PV1 to PV4 and may be allocated to a corresponding one of the first to fourth sub-controllers F1 to F4. Each of the credit sets C1 to C4 may include a sequential write credit SWC, a sequential read credit SRC, a random write credit RWC and a random read credit RRC. Credits of each item included in the credit sets C1 to C4 may be converted from the performance values of the same item.

For example, for each of the first to fourth sub-controllers F1 to F4, the sequential write credit SWC may be obtained by dividing the sequential write speed SW by the value of 4K, and sequential read credit SRC may be obtained by dividing the sequential read speed SR by the value of 4K. Further, the random write credit RWC may be the value of the random write speed RW, and the random read credit RRC may be the value of the random read speed RR. In this case, each credit may correspond to a number of operations in units of 4 KBs. However, the unit of calculating the credit, i.e., the credit in the unit of 4 KB is an example and therefore the credit may be in a different unit according to an embodiment.

Figure 3:
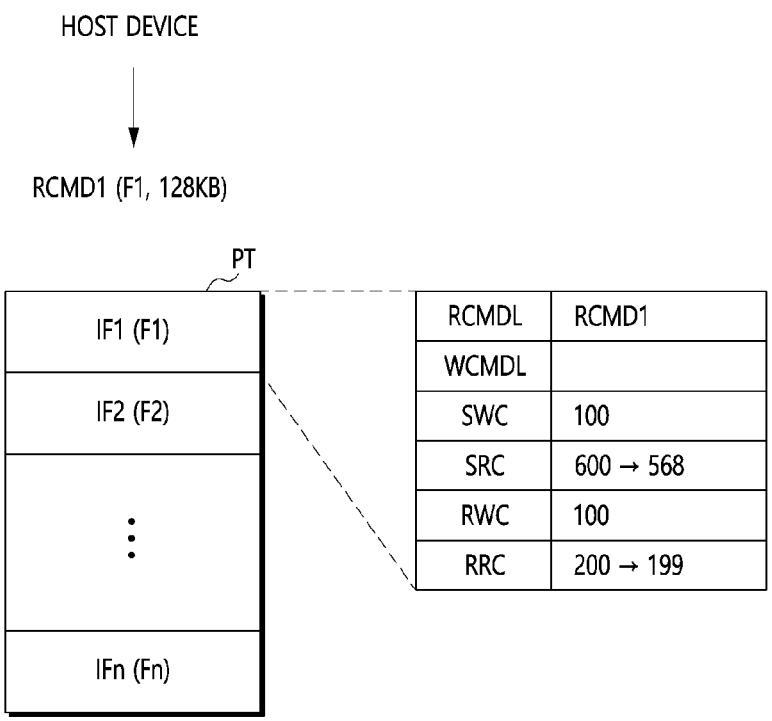
FIG. 3 is a diagram illustrating a scheme that a first sub-controller utilizes a sequential read credit and a random read credit in accordance with an embodiment.

FIG. 3 is a diagram illustrating a scheme that the first sub-controller F1 utilizes the sequential read credit SRC and the random read credit RRC in accordance with an embodiment.

Referring to FIG. 3, the performance manager 111 may manage a performance table PT. The performance table PT may include performance information IF1 to IFn of the currently activated sub-controllers F1 to Fn. For example, the performance information IF1 corresponding to the first sub-controller F1 may include a read command list RCMDL and a write command list WCMDL, which respectively include read commands and the write commands to be processed by the first sub-controller F1. Also, the performance information IF1 corresponding to the first sub-controller F1 may further include the sequential write credit SWC, the sequential read credit SRC, the random write credit RWC and the random read credit RRC that are allocated to the first sub-controller F1.

The memory system 100 may receive a read command RCMD1 from the host device 10. The read command RCMD1 may correspond to the first sub-controller F1 and may be for reading data of 128 KB. The read command RCMD1 may be listed in the read command list RCMDL within the performance information IF1 corresponding to the first sub-controller F1.

After that, the performance manager 111 may control the first sub-controller F1 to process the read command RCMD1 and may reduce the sequential read credit SRC and the random read credit RRC by respective adjustment amounts. The adjustment amount for the sequential read credit SRC may be calculated on the basis of the data amount 128 KB corresponding to the read command RCMD1. For example, the adjustment amount for the sequential read credit SRC may be a value of 32 obtained by dividing the data amount 128 KB corresponding to the read command RCMD1 by the credit unit, i.e., 4 KB. The adjustment amount for the random read credit RRC may be irrelevant to the data amount corresponding to the read command RCMD1. For example, the adjustment amount for the random read credit RRC may be one (1). According to an embodiment, the reducing of the sequential read credit SRC and the random read credit RRC may be performed before, during or after the processing of the read command RCMD1.

Differently from the above-described embodiment, an available sequential read credit SRC may be less than the adjustment amount. For example, the available sequential read credit SRC may be a value of 600 but the adjustment amount may be a value of 700. In this case, the deficit of the sequential read credit SRC, i.e., a value of 100 may be deducted from the sequential read credit SRC that is subsequently initialized.

The write command may be processed in the similar way to the read command. When the write command is processed, the adjustment amount for the sequential write credit SWC may be calculated on the basis of the data amount corresponding to the write command but the adjustment amount for the random write credit RWC may be a value irrelevant to the data amount corresponding to the write command.

Figure 4:
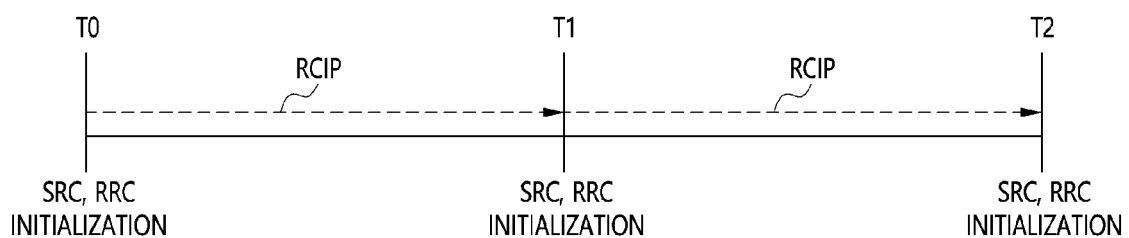
FIG. 4 is a diagram illustrating a scheme that a performance manager initializes sequential read credits and random read credits in accordance with an embodiment.

FIG. 4 is a diagram illustrating a scheme that the performance manager 111 initializes sequential read credits SRC and random read credits RRC in accordance with an embodiment.

Referring to FIG. 4, based on the read credit initialization period RCIP, the performance manager 111 may perform an initialization operation on sequential read credits SRC and random read credits RRC of all of the one or more sub-controllers F1 to Fn. Specifically, whenever the read credit initialization period RCIP elapses from the previous initialization (see timepoints T1 and T2 in FIG. 4), the sequential read credits SRC and the random read credits RRC of all of the one or more sub-controllers F1 to Fn may be initialized no matter how many sequential read credits SRC and random read credits RRC remain at each of the timepoints T1 and T2.

During the read credit initialization period RCIP, each of the sub-controllers F1 to Fn may process read commands of its own until at least one of the sequential read credit SRC and the random read credit RRC, which are assigned thereto, is exhausted. When at least one of the sequential read credit SRC and the random read credit RRC, which are assigned thereto, is exhausted during the read credit initialization period RCIP, each of the sub-controllers F1 to Fn might not process the read commands of its own until the sequential read credit SRC and the random read credit RRC are initialized.

Therefore, according to an embodiment, the sequential read credit SRC and the random read credit RRC corresponding to the size of the memory region assigned to each of the one or more sub-controllers F1 to Fn may be assigned thereto at each read credit initialization period RCIP, the maximum performance may be guaranteed for a read operation. Further, according to an embodiment, even when the resource of the memory system 100 is insufficient, prevented may be a situation that only a particular sub-controller intensively operates while remaining sub-controllers are idle without performing any operation.

Figure 5:
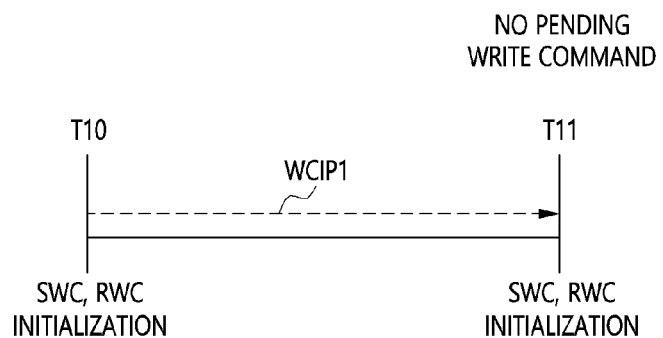
FIGS. 5, 6, and 7 are diagrams illustrating a scheme that a performance manager initializes sequential write credits and random write credits in accordance with an embodiment.
Figure 6:
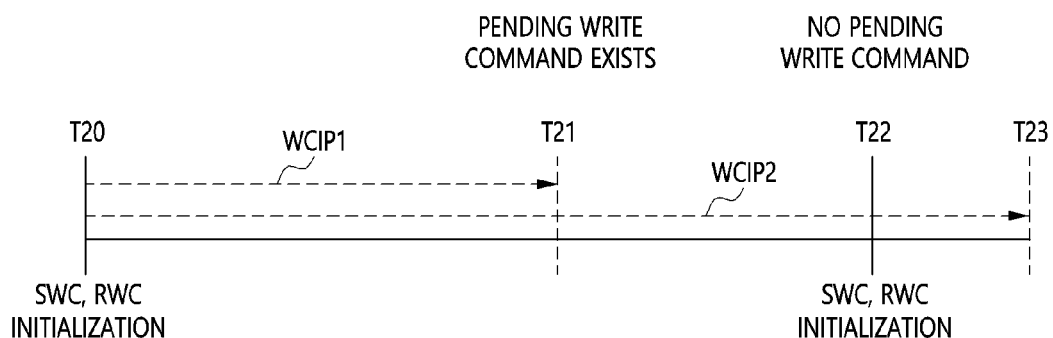
Figure 7:
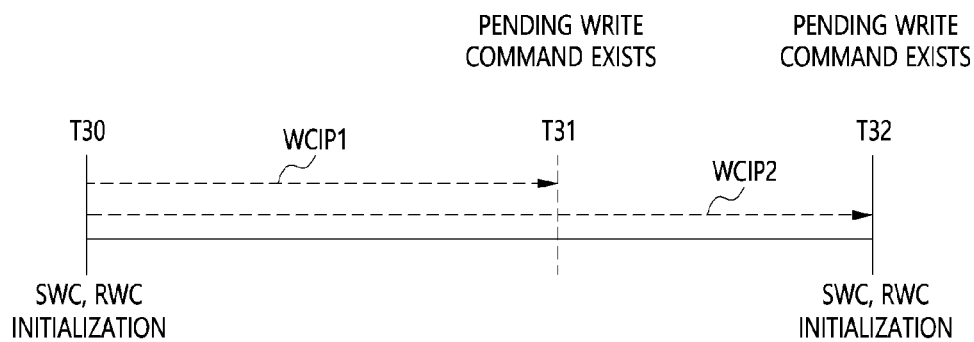

FIGS. 5 to 7 are diagrams illustrating a scheme that the performance manager 111 initializes sequential write credits SWC and random write credits RWC in accordance with an embodiment.

Referring to FIGS. 5 to 7, based on a first write credit initialization period WCIP1 and a second write credit initialization period WCIP2, the performance manager 111 may perform an initialization operation on sequential write credits SWC and random write credits RWC of all of the one or more sub-controllers F1 to Fn. The initialization operation may include initializing sequential write credits SWC and random write credits RWC of all of the one or more sub-controllers F1 to Fn. Specifically, the sequential write credits SWC and the random write credits RWC of all of the one or more sub-controllers F1 to Fn may be initialized when the first write credit initialization period WCIP1 elapses from the previous initialization and when there is no pending write operation or the second write credit initialization period WCIP2 elapses.

For example, referring to FIG. 5, there is no pending write command at a time point T11, at which the first write credit initialization period WCIP1 elapses from a time point T10, at which the sequential write credits SWC and the random write credits RWC are previously initialized, and therefore the sequential write credits SWC and the random write credits RWC may be initialized at the time point T11.

For example, referring to FIG. 6, there is a pending write command at a time point T21, at which the first write credit initialization period WCIP1 elapses from a time point T20, at which the sequential write credits SWC and the random write credits RWC are previously initialized, and therefore the sequential write credits SWC and the random write credits RWC might not be initialized at the time point T21. Further, the sequential write credits SWC and the random write credits RWC may be initialized at the time point T22, at which there is no pending write command before a time point T23, at which the second write credit initialization period WCIP2 elapses from the time point T20.

For example, referring to FIG. 7, there is a pending write command at a time point T31, at which the first write credit initialization period WCIP1 elapses from a time point T30, at which the sequential write credits SWC and the random write credits RWC are previously initialized, and therefore the sequential write credits SWC and the random write credits RWC might not be initialized at the time point T31. Further, the sequential write credits SWC and the random write credits RWC may be initialized even when there is a pending write command at a time point T32, at which the second write credit initialization period WCIP2 elapses from the time point T30, at which the sequential write credits SWC and the random write credits RWC are previously initialized.

Therefore, according to an embodiment, a ratio of write performances of the sub-controllers F1 to Fn may stay the same even when overall performance of the memory system 100 becomes gradually degraded as time goes by. Further, according to an embodiment, even when the resource of the memory system 100 is insufficient, prevented may be a situation that only a particular sub-controller intensively operates while remaining sub-controllers are idle without performing any operation.

Figure 8:
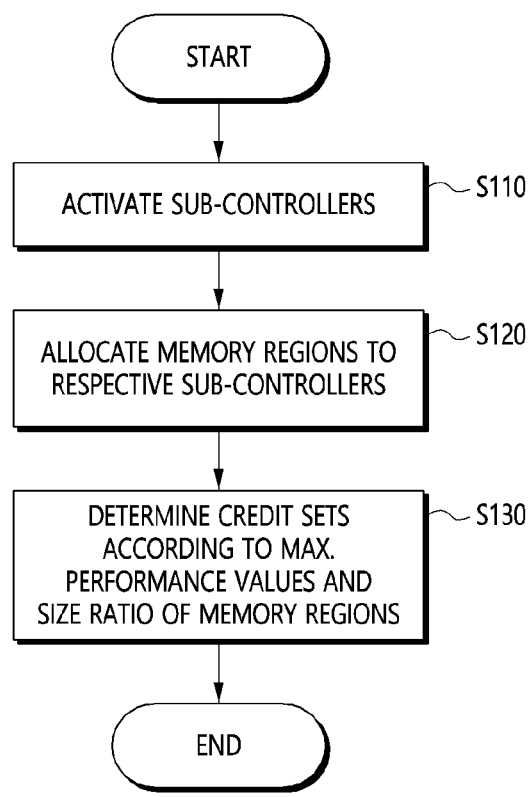
FIG. 8 is a flowchart illustrating a scheme that a performance manager calculates credit sets to be allocated to respective sub-controllers in accordance with an embodiment.

FIG. 8 is a flowchart illustrating a scheme that the performance manager 111 calculates credit sets to be allocated to the respective sub-controllers F1 to Fn in accordance with an embodiment.

Referring to FIG. 8, in step S110, the performance manager 111 may activate the plurality of sub-controllers F1 to Fn according to setting of the host device 10.

In step S120, according to the setting of the host device 10, the performance manager 111 may allocate the memory regions M1 to Mn respectively to the plurality of sub-controllers F1 to Fn, the memory regions M1 to Mn being included in the non-volatile memory device 120.

In step S130, based on the maximum performance values MPV and the size ratio of the memory regions M1 to Mn, the performance manager 111 may determine credit sets to be allocated respectively to the plurality of sub-controllers F1 to Fn.

Figure 9:
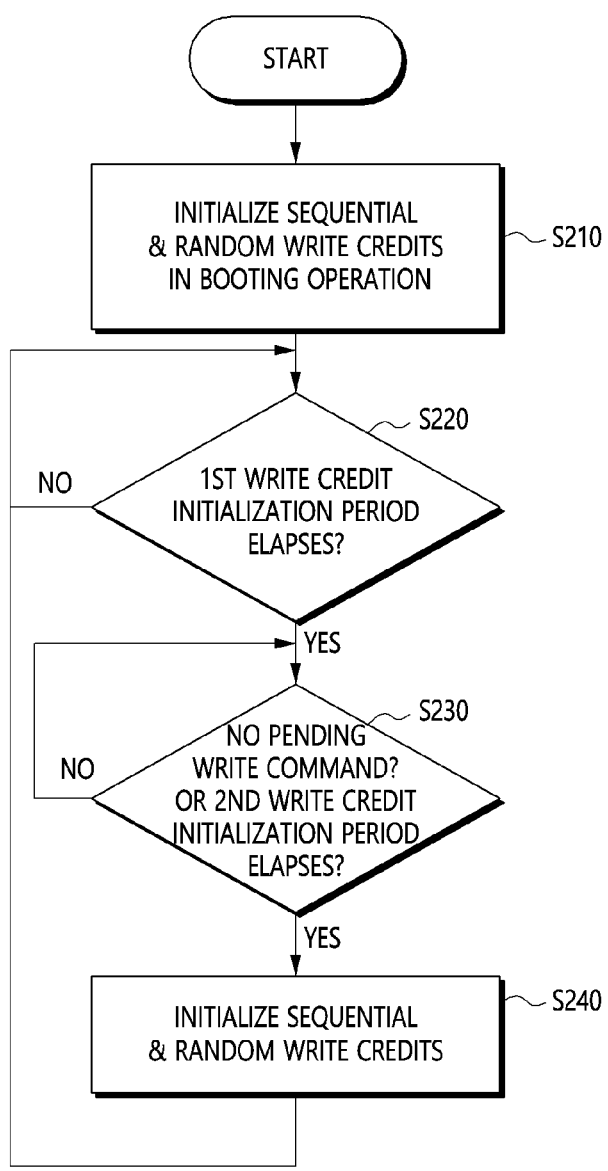
FIG. 9 is a flowchart illustrating an operation that a performance manager initializes sequential write credits and random write credits in accordance with an embodiment.

FIG. 9 is a flowchart illustrating an operation that the performance manager 111 initializes the sequential write credits SWC and the random write credits RWC in accordance with an embodiment.

Referring to FIG. 9, in step S210, the performance manager 111 may initialize the sequential write credits SWC and the random write credits RWC of all of one or more sub-controllers F1 to Fn in a booting operation.

In step S220, the performance manager 111 may determine whether the first write credit initialization period WCIP1 elapses from a time point, at which the sequential write credits SWC and the random write credits RWC are previously initialized. When the first write credit initialization period WCIP1 is determined not to elapse from the time point, the process may repeat step S220. When the first write credit initialization period WCIP1 is determined to elapse from the time point, the process may proceed to step S230.

In step S230, for all of one or more sub-controllers F1 to Fn, the performance manager 111 may determine whether there is no pending write command or the second write credit initialization period WCIP2 elapses from the time point, at which the sequential write credits SWC and the random write credits RWC are previously initialized. When the pending write command is determined to exist and the second write credit initialization period WCIP2 is determined not to elapse from the time point, the process may repeat step S230. When the pending write command is determined not to exist or the second write credit initialization period WCIP2 is determined to elapse from the time point, the process may proceed to step S240.

In step S240, for all of one or more sub-controllers F1 to Fn, the performance manager 111 may initialize the sequential write credits SWC and the random write credits RWC. After that, the process may proceed back to step S220.

Figure 10:
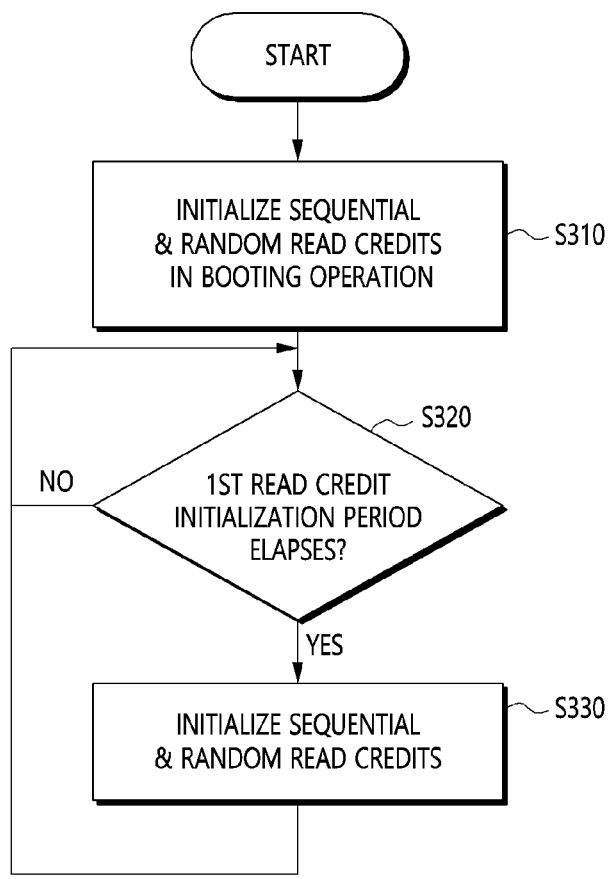
FIG. 10 is a flowchart illustrating an operation of initializing sequential read credits and random read credits in accordance with an embodiment.

FIG. 10 is a flowchart illustrating an operation of initializing the sequential read credits SRC and the random read credits RRC in accordance with an embodiment.

Referring to FIG. 10, in step S310, the performance manager 111 may initialize the sequential read credits SRC and the random read credits RRC of all of one or more sub-controllers F1 to Fn in a booting operation.

In step S320, the performance manager 111 may determine whether the read credit initialization period RCIP elapses from a time point, at which the sequential read credits SRC and the random read credits RRC are previously initialized. When the read credit initialization period RCIP is determined not to elapse from the time point, the process may repeat step S320. When the read credit initialization period RCIP is determined to elapse from the time point, the process may proceed to step S330.

In step S330, for all of one or more sub-controllers F1 to Fn, the performance manager 111 may initialize the sequential read credits SRC and the random read credits RRC. After that, the process may proceed back to step S320.

Figure 11:
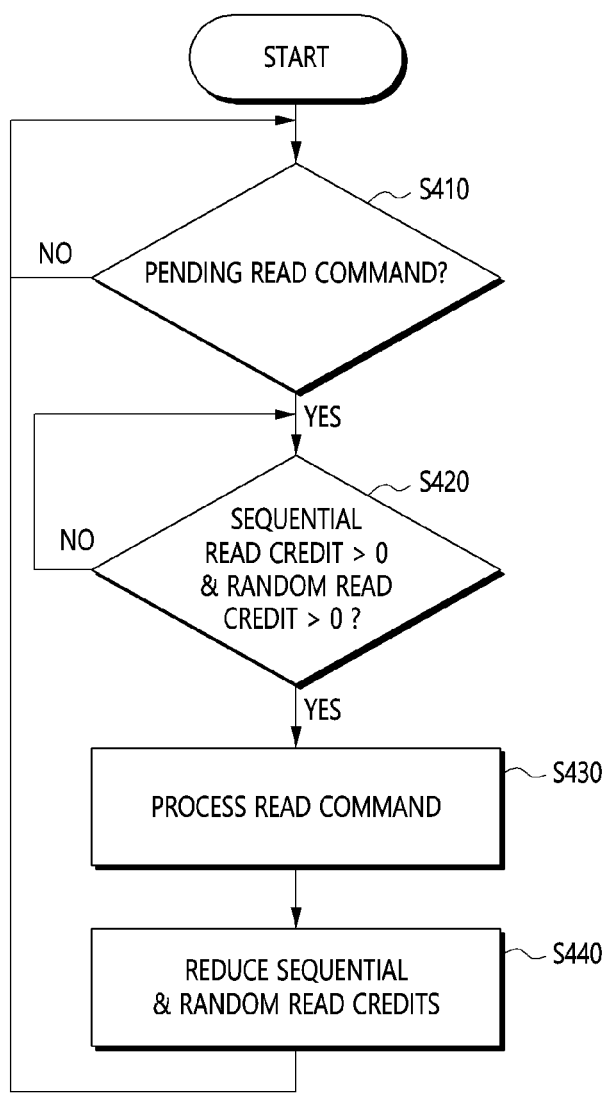
FIG. 11 is a flowchart illustrating an operation that a performance manager utilizes a sequential read credit and a random read credit for each sub-controller in accordance with an embodiment.

FIG. 11 is a flowchart illustrating an operation that the performance manager 111 utilizes the sequential read credit SRC and the random read credit RRC for each sub-controller in accordance with an embodiment. The performance manager 111 may perform, on each of the sub-controllers F1 to Fn, the operation illustrated in FIG. 11.

Referring to FIG. 11, in step S410, the performance manager 111 may determine whether there is a pending read command for a selected one of the sub-controllers F1 to Fn. When a pending read command is determined not to exist, the process may repeat step S410. When a pending read command is determined to exist, the process may proceed to step S420.

In step S420, the performance manager 111 may determine whether all the sequential read credit SRC and the random read credit RRC of the selected sub-controller are greater than zero (0). When at least one of the sequential read credit SRC and the random read credit RRC is determined not to be greater than zero (0), the process may repeat step S420. When all the sequential read credit SRC and the random read credit RRC of the selected sub-controller are determined to be greater than zero (0), the process may proceed to step S430. When step S420 is repeated, the process may proceed to step S430 as the sequential read credit SRC and the random read credit RRC are initialized.

In step S430, the performance manager 111 may control the selected sub-controller to process the read command.

In step S440, the performance manager 111 may reduce, by respective adjustment amounts, the sequential read credit SRC and the random read credit RRC of the selected sub-controller. After that, the process may proceed back to step S410.

In an embodiment, step S440 may be performed before step S430.

The performance manager 111 may perform, on a particular one of the sub-controllers F1 to Fn, the operation illustrated in FIG. 11. In an embodiment, the performance manager 111 may perform, sequentially on all of one or more sub-controllers F1 to Fn, the operation illustrated in FIG. 11. In an embodiment, the performance manager 111 may perform, simultaneously on all of one or more sub-controllers F1 to Fn, the operation illustrated in FIG. 11. The words "simultaneous" and "simultaneously" as used herein with respect to processes mean that the processes take place on overlapping intervals of time. For example, if a first process takes place over a first interval of time and a second process takes place simultaneously over a second interval of time, then the first and second intervals of time at least partially overlap each other such that there exists a time at which the first and second processes are both taking place.

Figure 12:
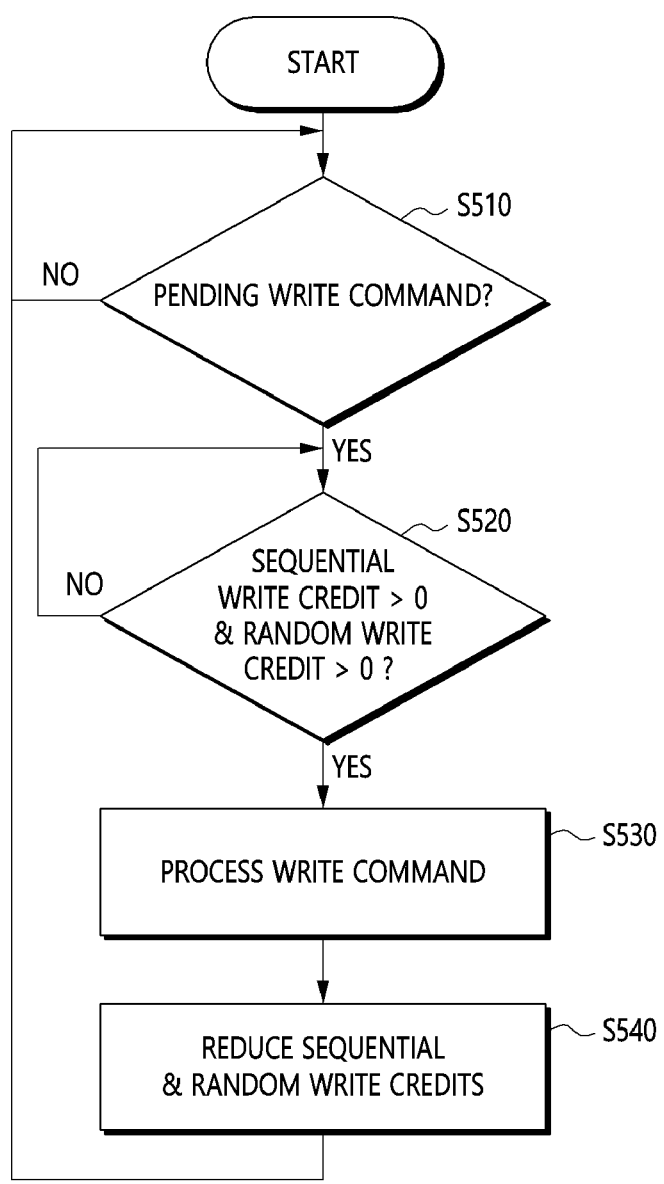
FIG. 12 is a flowchart illustrating an operation that a performance manager utilizes a sequential write credit and a random write credit for each sub-controller in accordance with an embodiment.

FIG. 12 is a flowchart illustrating an operation that the performance manager 111 utilizes the sequential write credit SWC and the random write credit RWC for each sub-controller in accordance with an embodiment. The performance manager 111 may perform, on each of the sub-controllers F1 to Fn, the operation illustrated in FIG. 12.

Referring to FIG. 12, steps S510 to S540 may be similar to steps S410 to S440 of FIG. 11. That is, similarly to the description on FIG. 11, the sequential write credit SWC and the random write credit RWC may be reduced as the write command is processed.

In accordance with an embodiment, memory system and operating method thereof may support sub-controllers configured to always provide a maximum read performance and configured to steadily provide a write performance of the same ratio.

Figure 13:
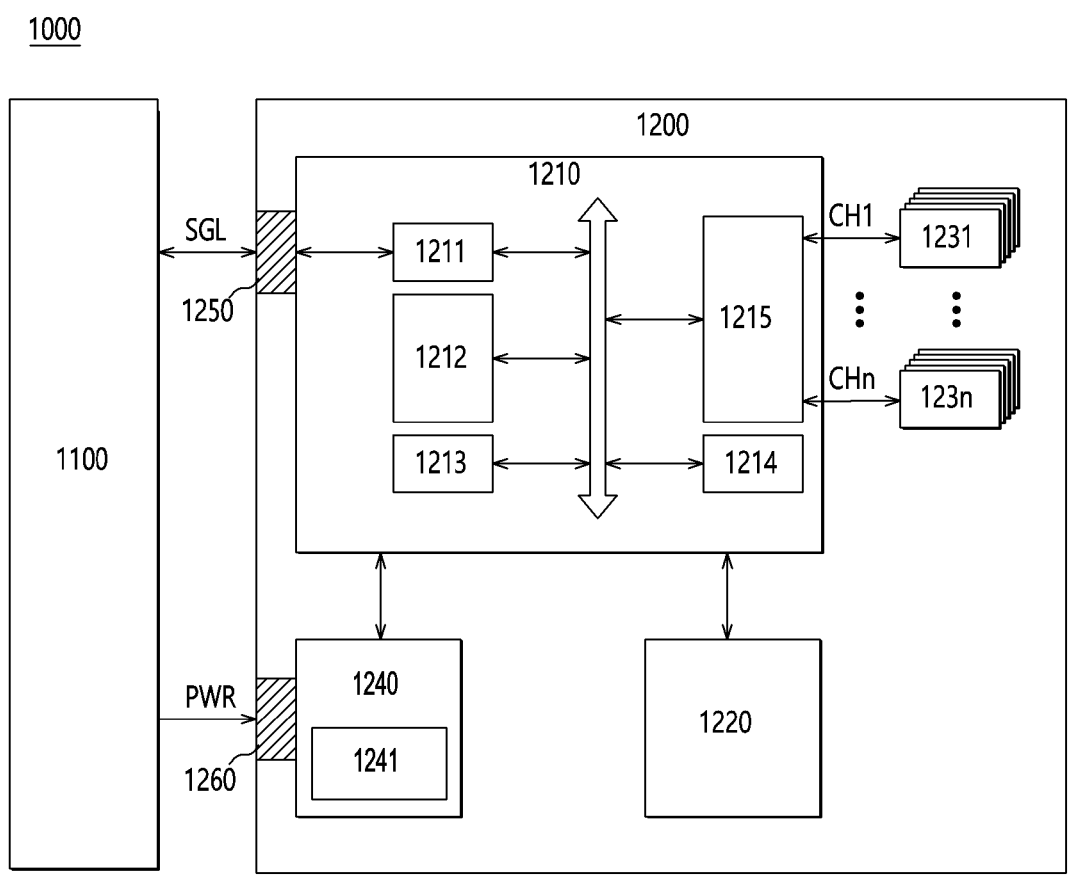
FIG. 13 is a diagram illustrating a data processing system including a solid state drive (SSD) in accordance with an embodiment.

FIG. 13 is a diagram illustrating a data processing system 1000 including a solid state drive (SSD) 1200 in accordance with an embodiment. Referring to FIG. 13, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include the controller 110 shown in FIG. 1.

The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The control unit 1212 may include the performance manager 111 shown in FIG. 1. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may store data to be stored in at least one of the nonvolatile memory devices 1231 to 123n. Further, the buffer memory device 1220 may store the data read from at least one of the nonvolatile memory devices 1231 to 123n. The data stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR input through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 14:
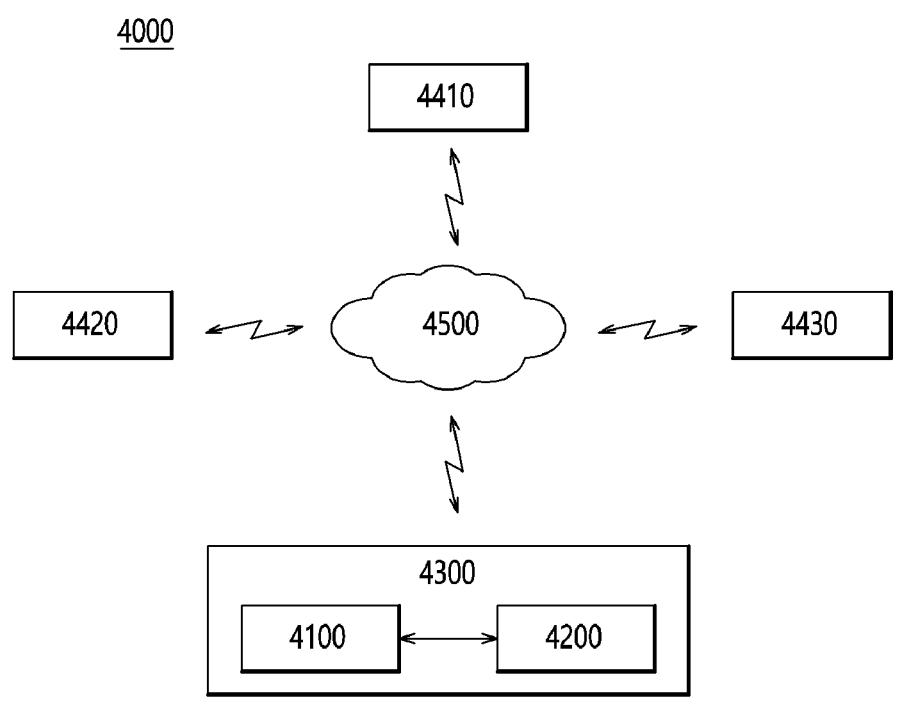
FIG. 14 is a diagram illustrating a network system including a memory system in accordance with an embodiment.

FIG. 14 is a diagram illustrating a network system 4000 including a memory system 4200 in accordance with an embodiment. Referring to FIG. 14, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1 or the SSD 1200 shown in FIG. 13.

While certain embodiments have been described above, it will be understood to those skilled in the art that the embodiments described are by way of example only. Accordingly, the memory system and operating method thereof should not be limited based on the described embodiments. Rather, the memory system and operating method thereof described herein should only be limited in light of the claims that follow when taken in conjunction with the above description and accompanying drawings.

What is claimed is:

1. A memory system comprising:
a non-volatile memory device; and
a performance managing circuit configured to:
activate a plurality of sub-controllers according to a setting of a host device,
allocate memory regions respectively to the plurality of sub-controllers, wherein the memory regions are included in the non-volatile memory device, and
determine, according to maximum performance values and a size ratio of the memory regions, credit sets to be allocated respectively to the plurality of sub-controllers,
wherein each of the credit sets includes a sequential operation credit and a random operation credit.

2. The memory system of claim 1, wherein the performance managing circuit is configured to:
divide each of the maximum performance values according to the size ratio,
convert the divided values into respective credits, and
allocate the converted credits respectively to the plurality of sub-controllers.

3. The memory system of claim 1, wherein the maximum performance values include a maximum sequential write speed, a maximum random write speed, a maximum sequential read speed, and a maximum random read speed.

4. The memory system of claim 1, wherein the sequential operation credit and the random operation credit are a sequential write credit and a random write credit, respectively, and
the performance managing circuit is configured to perform a second initialization operation on the sequential write credit and the random write credit when a first write credit initialization period elapses from completion of a first initialization operation and when there is not any pending write command or a second write credit initialization period elapses.

5. The memory system of claim 1, wherein the sequential operation credit and the random operation credit are a sequential read credit and a random read credit, respectively, and the performance managing circuit is configured to perform a second initialization operation on the sequential read credit and the random read credit when a read credit initialization period elapses from completion of a first initialization operation.

6. The memory system of claim 1, wherein the performance managing circuit is configured to:
control, when a sequential operation credit and a random operation credit of a first sub-controller among the plurality of sub-controllers are greater than zero (0), the first sub-controller to process an operation command, and
reduce the sequential operation credit and the random operation credit of the first sub-controller.

7. The memory system of claim 6, wherein:
the sequential operation credit and the random operation credit of the first sub-controller are a sequential read credit and a random read credit, respectively, when the operation command is a read command, and
the sequential operation credit and the random operation credit of the first sub-controller are a sequential write credit and a random write credit, respectively, when the operation command is a write command.

8. The memory system of claim 6, wherein the performance managing circuit is configured to control, when at least one of the sequential operation credit and the random operation credit of the first sub-controller is less than or equal to zero (0), the first sub-controller to process the operation command after the sequential operation credit and the random operation credit of the first sub-controller are initialized.

9. The memory system of claim 6, wherein the performance managing circuit is configured to:
calculate an adjustment amount based on an amount of data that is processed according to the operation command, and
reduce the sequential operation credit of the first sub-controller by the adjustment amount.

10. The memory system of claim 6, wherein:
the performance managing circuit is configured to reduce the random operation credit of the first sub-controller by an adjustment amount, and
the adjustment amount is irrelevant to an amount of data that is processed according to the operation command.

11. An operating method of a memory system, the operating method comprising:
activating a plurality of sub-controllers according to a setting of a host device;
allocating memory regions respectively to the plurality of sub-controllers; and
determining, according to maximum performance values and a size ratio of the memory regions, credit sets to be allocated respectively to the plurality of sub-controllers,
wherein each of the credit sets includes a sequential operation credit and a random operation credit.

12. The operating method of claim 11, wherein the determining of the credit sets includes:
dividing each of the maximum performance values according to the size ratio; and
converting the divided values into respective credits to be allocated respectively to the plurality of sub-controllers.

13. The operating method of claim 11, wherein the maximum performance values include a maximum sequential write speed, a maximum random write speed, a maximum sequential read speed and a maximum random read speed.

14. The operating method of claim 11, wherein the sequential operation credit and the random operation credit are a sequential write credit and a random write credit, respectively, and
the operating method further comprises performing a second initialization operation on the sequential write credit and the random write credit when a first write credit initialization period elapses from completion of a first initialization operation and when there is not any pending write command or a second write credit initialization period elapses.

15. The operating method of claim 11, wherein the sequential operation credit and the random operation credit are a sequential read credit and a random read credit, and
the operating method further comprises performing a second initialization operation on the sequential read credit and the random read credit when a read credit initialization period elapses from completion of a first initialization operation.

16. The operating method of claim 11, further comprising:
controlling, when a sequential operation credit and a random operation credit of a first sub-controller among the plurality of sub-controllers are greater than zero (0), the first sub-controller to process an operation command; and
reducing the sequential operation credit and the random operation credit of the first sub-controller.

17. The operating method of claim 16, wherein the reducing of the sequential operation credit includes:
calculating an adjustment amount based on an amount of data that is processed according to the operation command; and
reducing the sequential operation credit of the first sub-controller by the adjustment amount.

18. The operating method of claim 16, wherein:
the reducing of the random operation credit includes reducing the random operation credit of the first sub-controller by an adjustment amount, and
the adjustment amount is irrelevant to an amount of data that is processed according to the operation command.

19. An operating method of a memory system, the operating method comprising:
receiving an operation command for a first sub-controller among a plurality of sub-controllers;
controlling, when a sequential operation credit of the first sub-controller is greater than zero (0) and a random operation credit of the first sub-controller is greater than zero (0), the first sub-controller to process the operation command; and
reducing the sequential operation credit and the random operation credit of the first sub-controller.

20. The operating method of claim 19, further comprising:
allocating memory regions respectively to the plurality of sub-controllers;
converting, into sequential operation credits, values that are obtained by dividing a maximum sequential operation speed by a size ratio of the memory regions and converting, into random operation credits, values that are obtained by dividing a maximum random operation speed by the size ratio; and
allocating the sequential operation credits respectively to the plurality of sub-controllers and allocating the random operation credits respectively to the plurality of sub-controllers.

* * * * *